(12) United States Patent
Amano

(10) Patent No.: US 10,451,962 B2
(45) Date of Patent: Oct. 22, 2019

(54) PROJECTION OPTICAL SYSTEM AND PROJECTION DISPLAY DEVICE

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/100,415

(22) Filed: Aug. 10, 2018

(65) Prior Publication Data
US 2019/0056648 A1   Feb. 21, 2019

(30) Foreign Application Priority Data

Aug. 17, 2017 (JP) .................................. 2017-157551

(51) Int. Cl.
| | |
|---|---|
| *G03B 21/28* | (2006.01) |
| *G02B 27/09* | (2006.01) |
| *G02B 13/06* | (2006.01) |
| *G03B 21/14* | (2006.01) |
| *G02B 13/16* | (2006.01) |
| *G02B 13/18* | (2006.01) |
| *G02B 17/08* | (2006.01) |
| *G02B 5/10* | (2006.01) |
| *G02B 27/14* | (2006.01) |
| *G02B 27/28* | (2006.01) |

(52) U.S. Cl.
CPC ............. *G03B 21/28* (2013.01); *G02B 13/06* (2013.01); *G02B 13/16* (2013.01); *G02B 13/18* (2013.01); *G02B 17/08* (2013.01); *G02B 27/0955* (2013.01); *G02B 27/0983* (2013.01); *G03B 21/142* (2013.01); *G02B 5/10* (2013.01); *G02B 17/0856* (2013.01); *G02B 27/141* (2013.01); *G02B 27/149* (2013.01); *G02B 27/283* (2013.01)

(58) Field of Classification Search
CPC .... G03B 21/005; G03B 21/006; G03B 21/10; G03B 21/28; G03B 21/142; G03B 21/2066; G02B 27/0955; G02B 27/0977; G02B 27/0983
See application file for complete search history.

(56) References Cited

U.S. PATENT DOCUMENTS

| | | | | |
|---|---|---|---|---|
| 7,048,388 | B2 * | 5/2006 | Takaura .................. | G02B 13/16 353/102 |
| 2010/0238416 | A1 * | 9/2010 | Kuwata .................. | G03B 21/10 353/69 |
| 2016/0370692 | A1 * | 12/2016 | Ode .................... | G02B 27/0025 |

FOREIGN PATENT DOCUMENTS

| | | |
|---|---|---|
| JP | 2017-010023 A | 1/2017 |
| JP | 2017-032925 A | 2/2017 |
| JP | 2017-032927 A | 2/2017 |

* cited by examiner

*Primary Examiner* — Sultan Chowdhury
(74) *Attorney, Agent, or Firm* — Studebaker & Brackett PC

(57) ABSTRACT

A projection optical system forms an intermediate image at a position conjugate to a reduction side imaging surface, and forms a final image conjugate to the intermediate image on a magnification side imaging surface. The projection optical system includes a convex mirror disposed to be closer to the magnification side than the intermediate image and at least one lens that has a positive or negative refractive power and is disposed in an optical path so as to be closer to the magnification side than the convex mirror.

12 Claims, 9 Drawing Sheets

EXAMPLE 1

EXAMPLE 2

EXAMPLE 3

EXAMPLE 3

PROJECTION OPTICAL SYSTEM AND PROJECTION DISPLAY DEVICE

CROSS-REFERENCE TO RELATED APPLICATIONS

The present application claims priority under 35 U.S.C. § 119 to Japanese Patent Application No. 2017-157551, filed on Aug. 17, 2017. The above application is hereby expressly incorporated by reference, in its entirety, into the present application.

BACKGROUND OF THE INVENTION

1. Field of the Invention

The present invention relates to a projection optical system and a projection display device comprising the projection optical system.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In a projection optical system used in combination with a light valve in a projection display device, it has been demanded that aberration correction appropriate for the resolution of the light valve is satisfactorily performed in response to recent improvement in performance of the light valve. There is a demand for the projection optical system to have a higher performance while having a compact configuration in consideration of improvement in degree of freedom in setting the distance to the screen and the installability in the indoor space and to have a wide angle.

Examples of the projection optical system applicable to known projection display devices include optical systems described in JP2017-10023A, JP2017-32925A, and JP2017-32927A. JP2017-10023A, JP2017-32925A, and JP2017-32927A disclose an optical system that is composed of combination of a reflective optical system consisting of a mirror disposed to be closest to the magnification side and a refractive optical system including a plurality of lenses so as to form an intermediate image in the refractive optical system.

SUMMARY OF THE INVENTION

However, in the optical systems described in JP2017-10023A, JP2017-32925A, and JP2017-32927A, since the reflective surface of the mirror disposed to be closest to the magnification side is exposed to the outside air, there is a concern about deterioration of imaging performance caused by adhesion of foreign matter such as dust or dirt onto the reflective surface.

The present invention has an object to provide a projection optical system, which has favorable performance and is capable of reducing an influence on imaging performance due to adhesion of foreign matters or the like, as a projection optical system that is composed of a combination of a reflective optical system and a refractive optical system and forms an intermediate image, and a projection display device comprising the projection optical system.

In order to achieve the above-mentioned object, a projection optical system of the present invention forms an intermediate image at a position conjugate to a reduction side imaging surface and forms a final image conjugate to the intermediate image on a magnification side imaging surface. The projection optical system comprises: a convex mirror that is disposed to be closer to a magnification side than the intermediate image; and at least one lens that has a positive or negative refractive power and is disposed in an optical path so as to be closer to the magnification side than the convex mirror.

In the projection optical system of the present invention, it is preferable that a lens, which is disposed in the optical path so as to be closer to the magnification side than the convex mirror, is only one first lens.

In the projection optical system of the present invention, assuming that a focal length of the projection optical system is f and a focal length of the first lens is fL1, it is preferable to satisfy the Conditional Expression (1), and it is more preferable to satisfy the Conditional Expression (1-1).

$$|f/FL1|<0.2 \quad (1)$$

$$|f/fL1|<0.15 \quad (1\text{-}1)$$

In the projection optical system of the present invention, it is preferable that the first lens and the convex mirror have a common optical axis, and the first lens is an aspheric lens having a rotationally symmetrical shape.

In the projection optical system of the present invention, it is preferable that the first lens and the convex mirror have a common optical axis. Assuming that a focal length of the projection optical system is f and a distance between the first lens and the convex mirror in a direction of an optical axis at a lowest position on a lens surface of the first lens close to the convex mirror from the optical axis is Dm, it is preferable to satisfy the Conditional Expression (2), and it is more preferable to satisfy the Conditional Expression (2-1).

$$0.05<|f/Dm|<2 \quad (2)$$

$$0.07<|f/Dm|<1.5 \quad (2\text{-}1)$$

In the projection optical system of the present invention, the first lens may be disposed across the optical path closer to the magnification side than the convex mirror and the optical path closer to the reduction side than the convex mirror.

In the projection optical system of the present invention, assuming that a focal length of the projection optical system is f and a paraxial radius of curvature of the convex mirror is Mr, it is preferable to satisfy the Conditional Expression (3), and it is more preferable to satisfy the Conditional Expression (3-1).

$$0.01<|f/Mr|<0.2 \quad (3)$$

$$0.03<|f/Mr|<0.15 \quad (3\text{-}1)$$

In the projection optical system of the present invention, it is preferable that all optical elements composing the projection optical system have a common optical axis.

A projection display device of the present invention comprises: a light source; a light valve into which light emitted from the light source is incident; and the projection optical system of the present invention. It is preferable that the projection optical system projects an optical image using modulated light, which is modulated through the light valve, onto a screen.

In a case where the projection optical system of the present invention is applied to a projection display device, the "magnification side" means a projection target side (screen side), the "reduction side" means an original image display region side (light valve side).

In the present specification, the sign of the refractive power (also referred to as a power) and the surface shape of the optical surface will be considered in terms of the paraxial region unless otherwise specified. Further, the values used in the above conditional expressions are values in a case where the distance from the magnification side imaging surface to the lens surface closest to the magnification side is set to be infinite and the d line (a wavelength of 587.6 nm (nanometers)) is set as a reference.

In the present description, it should be noted that the terms "consisting of ~" and "consists of ~" are used in a substantial sense, and mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and a camera shaking correction mechanism.

According to the present invention, it is possible to provide a projection optical system, which has favorable performance and is capable of reducing an influence on imaging performance due to adhesion of foreign matters or the like, as a projection optical system that is composed of a combination of a reflective optical system and a refractive optical system and forms an intermediate image, and a projection display device comprising the projection optical system.

DESCRIPTION OF THE PREFERRED EMBODIMENTS

Figure 1:
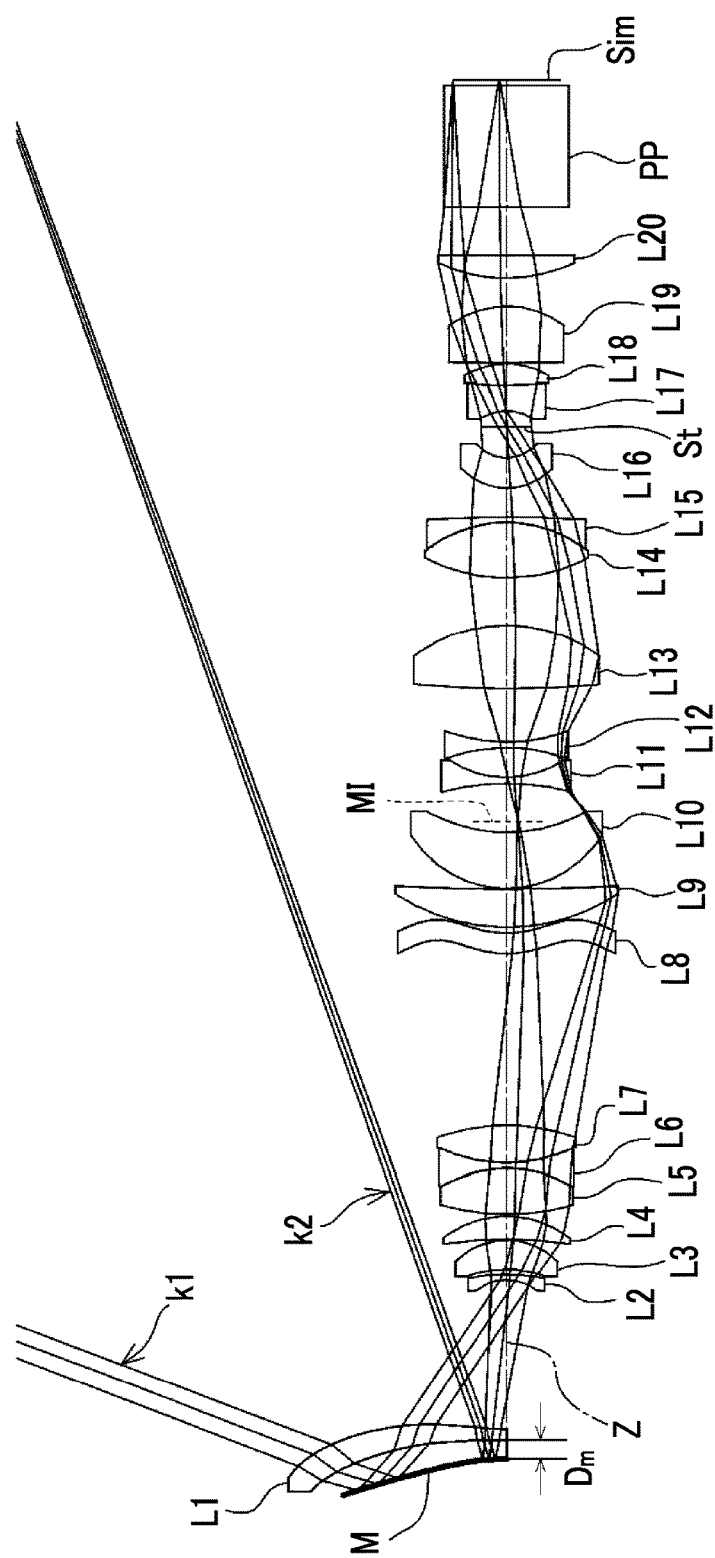
FIG. 1 is a cross-sectional view illustrating a configuration and an optical path of a projection optical system of Example 1 of the present invention.

Hereinafter, embodiments of the present invention will be described with reference to drawings. FIG. 1 is a cross-sectional view illustrating a configuration of a projection optical system according to an embodiment of the present invention. The exemplary configuration shown in FIG. 1 corresponds to Example 1 to be described later. In FIG. 1, the left side is the magnification side, and the right side is the reduction side, and rays with the maximum angle of view k1 and rays with a low angle of view k2 are also shown.

In FIG. 1, assuming that the projection optical system is mounted on a projection display device, the screen Scr, the optical member PP and the image display surface Sim of the light valve are also illustrated. The optical member PP is a member of which an incident surface and an exit surface are parallel, and is a member such as a prism, a filter, or a cover glass used in the color synthesizing section or the illumination light separating section. The optical member PP is not an indispensable component, and the optical member PP may be configured to be omitted.

In a case where the configuration shown in FIG. 1 is applied to the projection display device, rays, which are made to have image information through the image display surface Sim, are incident into the projection optical system through the optical member PP, and are transmitted onto a screen (not shown in the drawing) through the projection optical system. That is, the image display surface Sim corresponds to the reduction side imaging surface, and the screen corresponds to the magnification side imaging surface.

In the projection optical system of the example shown in FIG. 1, a convex mirror M, a first lens L1, lenses L2 to L16, an aperture stop St, and lenses L17 to L20 are arranged in order from the magnification side to the reduction side. In the example of FIG. 1, the first lens L1 is disposed across both the optical path closer to the magnification side than the convex mirror M and the optical path closer to the reduction side than the convex mirror M, and the ray is transmitted through the first lens L1 twice in total before and after reflection by the convex mirror M. The example shown in FIG. 1 is just an example, and the number of lenses included in the projection optical system may be different from that in the example shown in FIG. 1.

The projection optical system forms an intermediate image MI at a position conjugate to a reduction side imaging surface and forms a final image conjugate to the intermediate image MI on a magnification side imaging surface. That is, the projection optical system re-forms the intermediate image MI, which is formed inside the projection optical system, on the magnification side imaging surface. In the example of FIG. 1, the intermediate image MI is positioned between the lens L10 and the lens L11. In FIG. 1, the intermediate image MI is conceptually shown, and a part of the intermediate image MI including the vicinity of the optical axis is indicated by the dotted line, and a position of the intermediate image MI in the direction of the optical axis is basically shown as the position in the vicinity of the optical axis.

In the projection optical system configured to form an intermediate image, the back focal length of the optical system consisting of the optical elements closer to the magnification side than the intermediate image MI can be shortened, and the diameter of the magnification side lens can be reduced. As a result, the optical system is suitable for shortening the focal length of the whole system and achieving a wide angle.

This projection optical system has a convex mirror M at a position closer to the magnification side than the intermediate image MI. The convex mirror M is a mirror having a convex reflective surface. By providing the convex mirror M at a position closer to the magnification side than the intermediate image MI, it is possible to perform correction on off-axis rays without generating lateral chromatic aberration, and there is an advantage in aberration correction.

In the projection optical system, at least one lens, which has a positive or negative refractive power, is disposed in an optical path so as to be closer to the magnification side than the convex mirror M. It is possible to impart the sealing effect of the convex mirror M on the lens disposed in the optical path closer to the magnification side than the convex mirror M. Therefore, it is possible to avoid problems such as deterioration of imaging performance and reduction in brightness caused by adhesion of foreign matters such as dust or dirt onto the convex mirror M. By setting a member disposed in the optical path so as to be closer to the magnification side than the convex mirror M as a lens having a refractive power other than a member such as a cover glass having no refractive power, it is possible to perform correction on the off-axis rays. As a result, it is possible to satisfactorily correct distortion and field curvature.

In the example of FIG. 1, the first lens L1 is positioned in the optical path closer to the magnification side than the convex mirror M, and the lens disposed in the optical path closer to the magnification side than the convex mirror M is only one first lens L1. The lens disposed on the magnification side tends to be large. However, by limiting the number of lenses disposed in the optical path closer to the magnification side than the convex mirror M to one as the minimum number of lenses, it is possible to suppress the increase in size of the optical system. Thereby, this configuration contributes to cost reduction. In addition, the "one lens" described herein means one single lens which is not cemented.

As shown in the example of FIG. 1, it is preferable that the first lens L1 and the convex mirror M have a common optical axis Z. In this case, since the structure can be simplified, contribution to cost reduction can be made.

It is preferable that all the optical elements composing the projection optical system have a common optical axis. In this case, since the structure of the whole lens system can be simplified, contribution to cost reduction can be made. It should be noted that all the optical elements composing the projection optical system described herein include both a mirror and a lens. Further, the above-mentioned common optical axis also includes a substantially common optical axis. For example, the common optical axis includes a production tolerance range which does not significantly degrade the performance of the optical system.

It is preferable that the first lens L1 is an aspheric lens having a rotationally symmetrical shape. In the configuration of FIG. 1, the first lens L1 and the convex mirror M have a common optical axis Z, and the first lens L1 has an aspheric lens surface rotationally symmetric with respect to the common optical axis Z. The first lens L1 is a lens disposed in the optical path closest to the magnification side. Therefore, by appropriately setting the first lens L1 as an aspheric lens, it is possible to perform aberration correction appropriate for each ray of each image height. Thus, the system is able to work effectively by correcting distortion and field curvature which are problems in achieving the wide angle.

Assuming that the focal length of the projection optical system is f and a focal length of the first lens L1 is fL1, it is preferable to satisfy Conditional Expression (1). By not allowing the result of Conditional Expression (1) to be equal to or greater than the upper limit, it is possible to minimize the refractive power of the first lens L1. In a case where the first lens L1 is a positive lens, by not allowing the result of Conditional Expression (1) to be equal to or greater than the upper limit, it is possible to suppress the action of narrowing the angle of view by the first lens L1. Therefore, it is possible to prevent an excessive load for achieving a wide angle in the convex mirror M. In a case where the first lens L1 is a negative lens, by not allowing the result of Conditional Expression (1) to be equal to or greater than the upper limit, it becomes easy to correct distortion and field curvature. Since the first lens L1 is a lens having a positive or negative refractive power and the projection optical system is an imaging optical system, necessarily $0 \le |f/fL1|$ is established. In addition, in a case of a configuration in which Conditional Expression (1-1) is satisfied instead of Conditional Expression (1), it is possible to obtain more favorable characteristics.

$$|f/fL1|<0.2 \tag{1}$$

$$|f/fL1|<0.15 \tag{1-1}$$

In a case where the first lens L1 and the convex mirror M have the common optical axis Z, assuming that a distance between the first lens L1 and the convex mirror M in a direction of an optical axis Z at a lowest position on a lens surface of the first lens L1 close to the convex mirror M from the optical axis Z is Dm and a focal length of the projection optical system is f, it is preferable to satisfy the Conditional Expression (2). By not allowing the result of Conditional Expression (2) to be equal to or less than the lower limit, it is possible to prevent the air gap between the first lens L1 and the convex mirror M from becoming excessively large. As a result, it is possible to minimize the lens diameter of the first lens L1. By not allowing the result of Conditional Expression (2) to be equal to or greater than the upper limit, it is possible to prevent the air gap between the first lens L1 and the convex mirror M from becoming excessively small. As a result, it becomes easy to avoid physical interference between the first lens L1 and the convex mirror M, and it becomes easy to form the structure of the holding mechanism of each member. In addition, in a case of a configuration in which Conditional Expression (2-1) is satisfied instead of Conditional Expression (2), it is possible to obtain more favorable characteristics.

$$0.05<|f/Dm|<2 \tag{2}$$

$$0.07<|f/Dm|<1.5 \tag{2-1}$$

In order to facilitate understanding, FIG. 1 shows Dm. In a case where the lens surface of the first lens L1 close to the convex mirror M is present on the optical axis Z as in the example of FIG. 1, the above-mentioned term "the lowest position on the lens surface of the first lens L1 close to the convex mirror M from the optical axis Z" is a position at which the height from the optical axis Z is 0, that is, a position on the optical axis. Therefore, "Dm" in the case where the lens surface of the first lens L1 close to the convex mirror M is present on the optical axis Z is a distance on the optical axis between the convex mirror M and the lens surface of the first lens L1 close to the convex mirror M.

Assuming that the focal length of the projection optical system is f and a paraxial radius of curvature of the convex mirror M is Mr, it is preferable to satisfy the Conditional Expression (3). By not allowing the result of Conditional Expression (3) to be equal to or less than the lower limit, it is possible to ensure the power of the convex mirror M. Thus, it is possible to minimize the diameter of the convex mirror M and the diameter of the lens disposed in the optical path closer to the magnification side than the convex mirror M. By not allowing the result of Conditional Expression (3) to be equal to or greater than the upper limit, it is possible to minimize the power of the convex mirror M. Thus, it becomes easy to correct distortion and field curvature, which are generated by the convex mirror M, through the lens closer to the reduction side than the convex mirror M. In addition, in a case of a configuration in which Conditional Expression (3-1) is satisfied instead of Conditional Expression (3), it is possible to obtain more favorable characteristics.

$$0.01<|f/Mr|<0.2 \qquad (3)$$

$$0.03<|f/Mr|<0.15 \qquad (3\text{-}1)$$

The system consisting of all the optical elements positioned in the optical path closer to the magnification side than the intermediate image MI among the optical elements composing the projection optical system is referred to as a first optical system. Assuming that the focal length of the first optical system is f1 and the focal length of the projection optical system is f, it is preferable to satisfy the Conditional Expression (4). Conditional Expression (4) is a conditional expression relating to the relay magnification. In a case where the result of Conditional Expression (4) is equal to or less than the lower limit, the relay magnification becomes small, and the F number of the first optical system tends to decrease. In a case where the wide angle and high performance are intended to be achieved with an optical system having a small F number, it is necessary to correct aberrations corresponding to such optical system, for example, spherical aberration and astigmatism. By not allowing the result of Conditional Expression (4) to be equal to or less than the lower limit, it is possible to prevent the F-number of the first optical system from becoming excessively small. Therefore, there is an advantage in correction of spherical aberration and astigmatism while achieving the wide angle. In a case where the result of Conditional Expression (4) is equal to or greater than the upper limit, the relay magnification increases, and the size of the intermediate image MI tends to increase. By not allowing the result of Conditional Expression (4) to be equal to or greater than the upper limit, it is possible to minimize the size of the intermediate image MI. Therefore, it is possible to suppress an increase in lens diameter of the first optical system. Further, by not allowing the result of Conditional Expression (4) to be equal to or greater than the upper limit, it becomes easy to correct distortion and field curvature in the first optical system. In addition, in a case of a configuration in which Conditional Expression (4-1) is satisfied instead of Conditional Expression (4), it is possible to obtain more favorable characteristics.

$$1<|f1/f|<2.5 \qquad (4)$$

$$1.3<|f1/f|<2.2 \qquad (4\text{-}1)$$

As in the example of FIG. 1, the first lens L1 may be disposed across both the optical path closer to the magnification side than the convex mirror M and the optical path closer to the reduction side than the convex mirror M. In such a case, the ray traveling from the image display surface Sim to the screen is transmitted through the first lens L1 before being incident on the convex mirror M in the projection optical system, and is transmitted through the first lens L1 even after being reflected by the convex mirror M. Thereby, it is possible to provide the effect of aberration correction for four surfaces with one lens, and there is an advantage in correcting off-axis aberrations.

The above-mentioned preferred configurations and available configurations may be arbitrary combinations, and it is preferable to selectively adopt the configurations in accordance with required specification. According to the present embodiment, in the projection optical system configured to have a mirror and a plurality of lenses and to form an intermediate image, it is possible to reduce the influence on the imaging performance due to adhesion of foreign matters, and it is possible to maintain favorable performance. Further, the present embodiment is advantageous for maintaining favorable performance in a wide-angle optical system having, for example, a total angle of view greater than 130 degrees.

Next, numerical examples of the projection optical system of the present invention will be described. It should be noted that the numerical data pieces of the following examples are all normalized such that the absolute value of the focal length of the whole system is 1.00, and are rounded up to a predetermined number of decimal places.

Example 1

A lens configuration and an optical path of a projection optical system of Example 1 are shown in FIG. 1, and a configuration and an illustration method thereof is as described above. Therefore, repeated descriptions are partially omitted herein. The projection optical system of Example 1 includes a convex mirror M, a first lens L1, and lenses L2 to L20. The first lens L1 is disposed across both the optical path closer to the reduction side than the convex mirror M and the optical path closer to the magnification side than the convex mirror M. An intermediate image MI is formed between the lens L10 and the lens L11. An aperture stop St is disposed between the lens L16 and the lens L17.

Table 1 shows basic lens data of the projection optical system of Example 1, Table 2 shows specification, and Table 3 shows aspheric surface coefficients thereof. In Table 1, the column of the surface number shows surface numbers. The surface closest to the magnification side is the first surface, and the surface numbers increase one by one toward the reduction side. The column of R shows radii of curvature of the respective surfaces. The column of D shows surface distances on the optical axis between the respective surfaces and the surfaces adjacent to the reduction side. Further, the column of Nd shows refractive indexes of the respective components at the d line (a wavelength of 587.6 nm (nanometers)), and the column of vd shows Abbe numbers of the respective components at the d line.

In Table 1, reference signs of radii of curvature of surface shapes convex toward the magnification side are set to be positive, and reference signs of radii of curvature of surface shapes convex toward the reduction side are set to be negative. Table 1 additionally shows the aperture stop St and the optical member PP. In Table 1, the "reflective surface" is noted in the column of Nd of the surface corresponding to the convex mirror M, and the surface number and the phrase (St) are noted in the column of the surface number of the surface corresponding to the aperture stop St. The numerical value in the uppermost place in the column of D in Table 1 corresponds to the distance from the magnification side imaging surface to the first lens L1. Further, constituent elements consisting of the first face and the second face in Table 1 and constituent elements consisting of the fourth face and the fifth face in Table 1 correspond to the first lens L1.

Table 2 shows, as specification of the projection optical system, respective values of the absolute value |f| of the focal length, the back focal length Bf at the air conversion distance in a case where the reduction side is set as a back side, F number FNo., and the maximum total angle of view 2ω, on the basis of the d line. [°] in the place of 2ω indicates that the unit thereof is a degree.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "×10$^{\pm n}$". The aspheric surface coefficients are values of the coefficients KA and Am (m=3, 4, 5, . . . ) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

TABLE 1

Example 1

| Surface Number | R | D | Nd | νd |
|---|---|---|---|---|
|  |  | −130.9057 |  |  |
| *1 | 14.6389 | −0.5546 | 1.53158 | 55.08 |
| *2 | −30.7593 | −0.9244 |  |  |
| *3 | −12.1698 | 0.9244 | Reflective Surface |  |
| *4 | −30.7593 | 0.5546 | 1.53158 | 55.08 |
| *5 | 14.6389 | 7.3702 |  |  |
| 6 | −2.4855 | 0.2404 | 1.76182 | 26.52 |
| 7 | −11.6130 | 0.2601 |  |  |
| 8 | −6.3363 | 1.4369 | 1.72916 | 54.68 |
| 9 | −3.7288 | 0.0371 |  |  |
| 10 | −20.8462 | 1.1330 | 1.89286 | 20.36 |
| 11 | −5.3954 | 0.1161 |  |  |

TABLE 1-continued

Example 1

| Surface Number | R | D | Nd | νd |
|---|---|---|---|---|
| 12 | 13.3618 | 2.2204 | 1.62041 | 60.29 |
| 13 | −6.6564 | 0.2494 | 1.84666 | 23.78 |
| 14 | 8.5232 | 1.8261 | 1.49700 | 81.61 |
| 15 | −10.6704 | 8.4665 |  |  |
| *16 | 6.0986 | 1.0171 | 1.51007 | 56.24 |
| *17 | 7.0537 | 0.2772 |  |  |
| 18 | 10.6663 | 1.8580 | 1.80000 | 29.84 |
| 19 | 105.4092 | 0.0368 |  |  |
| 20 | 5.8428 | 2.7735 | 1.80400 | 46.58 |
| 21 | 8.5326 | 2.4413 |  |  |
| 22 | −13.2254 | 0.2773 | 1.58913 | 61.13 |
| 23 | 5.4722 | 1.4640 |  |  |
| 24 | −9.0034 | 0.2772 | 1.62041 | 60.29 |
| 25 | 9.2385 | 2.6276 |  |  |
| 26 | 53.6287 | 3.1434 | 1.80100 | 34.97 |
| 27 | −7.9801 | 2.3462 |  |  |
| 28 | 9.3083 | 2.7161 | 1.80400 | 46.58 |
| 29 | −6.8617 | 0.2587 | 1.84666 | 23.78 |
| 30 | −56.8728 | 1.4528 |  |  |
| 31 | 3.2648 | 1.4792 | 1.80518 | 25.42 |
| 32 | 2.0373 | 1.5563 |  |  |
| 33 (St) | ∞ | 0.7394 |  |  |
| 34 | −2.5640 | 1.2624 | 1.74077 | 27.79 |
| 35 | 19.9752 | 1.0368 | 1.59282 | 68.62 |
| 36 | −4.1708 | 0.0368 |  |  |
| 37 | 173.9237 | 2.7734 | 1.49700 | 81.61 |
| 38 | −5.0349 | 1.3616 |  |  |
| 39 | 8.2094 | 1.1219 | 1.69680 | 55.53 |
| 40 | 299.0762 | 2.6959 |  |  |
| 41 | ∞ | 5.9721 | 1.51633 | 64.14 |
| 42 | ∞ |  |  |  |

TABLE 2

Example 1

| |f| | 1.00 |
|---|---|
| Bf | 6.63 |
| FNo. | 2.00 |
| 2ω [°] | 139.6 |

TABLE 3

Example 1

Surface Number

|  | 1 | 2 | 3 |
|---|---|---|---|
| KA | 1.000000000000E+00 | 1.000000000000E+00 | 1.656351255008E+00 |
| A3 | 0.000000000000E+00 | 0.000000000000E+00 | −6.230043364751E−03 |
| A4 | −1.952892866462E−03 | 3.705894559060E−03 | 7.373362384681E−03 |
| A5 | 4.721092409151E−05 | −1.336416545388E−03 | −3.353180968021E−03 |
| A6 | 4.014096749273E−05 | 3.718431994532E−05 | 5.248809987518E−04 |
| A7 | −2.246654051397E−06 | 3.804903125822E−05 | 1.583717069747E−04 |
| A8 | −4.184313817429E−07 | −3.539327825309E−06 | −6.720713938103E−05 |
| A9 | 3.935711550851E−08 | −4.135721658561E−07 | 1.795319069761E−06 |
| A10 | 1.146586607095E−09 | 6.019861179852E−08 | 2.532762309778E−06 |
| A11 | −2.891116064302E−10 | 8.942105051384E−10 | −2.986335129256E−07 |
| A12 | 9.065711682694E−12 | −3.447318208270E−10 | −4.167956409729E−08 |
| A13 | 7.616964381773E−13 | 7.122618153849E−12 | 8.824570837261E−09 |
| A14 | −4.923046176854E−14 | 2.764211747867E−13 | 1.953560546281E−10 |
| A15 |  |  | −1.225861104823E−10 |
| A16 |  |  | 2.885356863120E−12 |
| A17 |  |  | 8.412003312067E−13 |
| A18 |  |  | −4.055382323331E−14 |
| A19 |  |  | −2.297302522124E−15 |
| A20 |  |  | 1.467727223475E−16 |

TABLE 3-continued

Example 1

| | Surface Number | |
|---|---|---|
| | 4 | 5 |
| KA | 1.000000000000E+00 | 1.000000000000E+00 |
| A3 | 0.000000000000E+00 | 0.000000000000E+00 |
| A4 | 3.705894559060E−03 | −1.952892866462E−03 |
| A5 | −1.336416545388E−03 | 4.721092409151E−05 |
| A6 | 3.718431994532E−05 | 4.014096749273E−05 |
| A7 | 3.804903125822E−05 | −2.246654051397E−06 |
| A8 | −3.539327825309E−06 | −4.184313817429E−07 |
| A9 | −4.135721658561E−07 | 3.935711550851E−08 |
| A10 | 6.019861179852E−08 | 1.146586607095E−09 |
| A11 | 8.942105051384E−10 | −2.891116064302E−10 |
| A12 | −3.447318208270E−10 | 9.065711682694E−12 |
| A13 | 7.122618153849E−12 | 7.616964381773E−13 |
| A14 | 2.764211747867E−13 | −4.923046176854E−14 |

| | Surface Number | |
|---|---|---|
| | 16 | 17 |
| KA | 1.000000000000E+00 | 1.000000000000E+00 |
| A3 | 1.567777320994E−02 | 2.574310543214E−02 |
| A4 | −7.260073873654E−03 | −1.523199728570E−02 |
| A5 | 1.119004943253E−03 | 6.352916698599E−03 |
| A6 | −6.577630265473E−04 | −1.705784128524E−03 |
| A7 | 1.032188747069E−04 | −5.641421218180E−04 |
| A8 | 4.930196521763E−05 | 3.339255513596E−04 |
| A9 | −3.886792279710E−05 | −1.553167855719E−05 |
| A10 | 2.038477913547E−06 | −1.792764831303E−05 |
| A11 | 3.802025780594E−06 | 3.350362722548E−06 |
| A12 | −4.353717744411E−07 | 2.713213692898E−07 |
| A13 | −1.941568340131E−07 | −1.430016833784E−07 |
| A14 | 2.587035302578E−08 | 7.137082941975E−09 |
| A15 | 5.655764532252E−09 | 2.533050602584E−09 |
| A16 | −7.915033431577E−10 | −2.940283886558E−10 |
| A17 | −8.834501444004E−11 | −1.577382799461E−11 |
| A18 | 1.255296263307E−11 | 3.190970229536E−12 |
| A19 | 5.709253894906E−13 | −1.377962995732E−14 |
| A20 | −8.129967228424E−14 | −8.066975670716E−15 |

Figure 4:
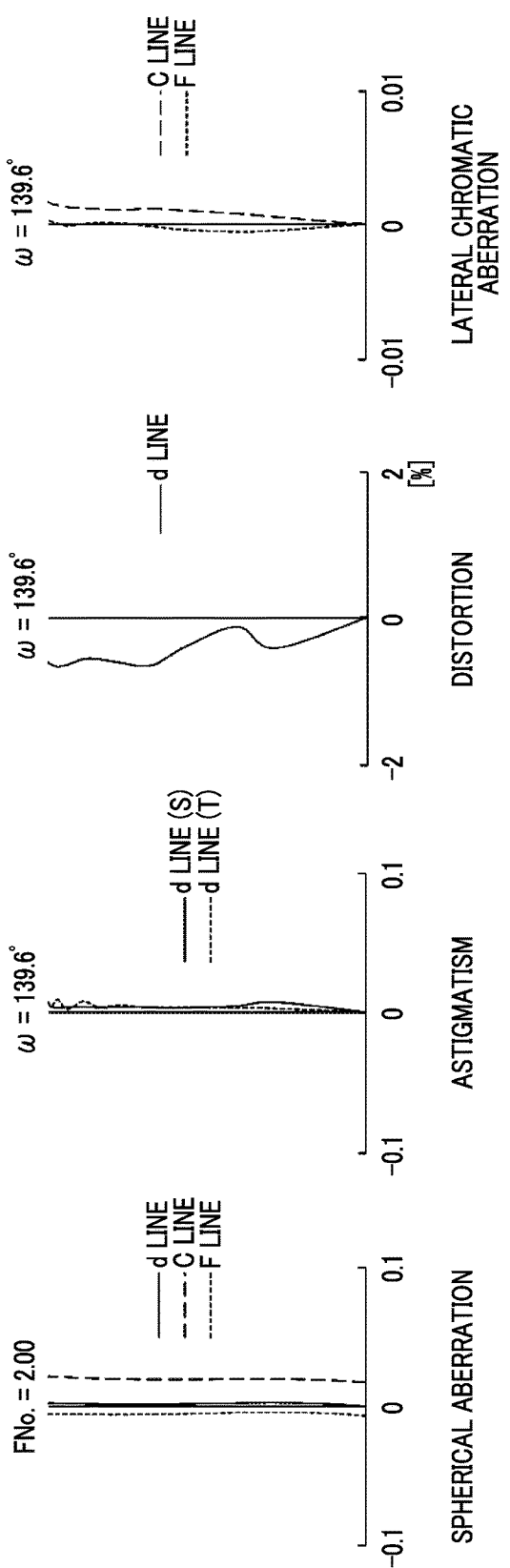
FIG. 4 is a diagram of aberrations of the projection optical system of Example 1 of the present invention.

FIG. 4 shows aberration diagrams of spherical aberration, astigmatism, distortion, and lateral chromatic aberration of the projection optical system of Example 1 in order from the left side. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view. These aberration diagrams are aberration diagrams in a case where the distance from the magnification side imaging surface to the first lens L1 is a value shown in Table 1.

In the description of Example 1, reference signs, meanings, and description methods of the respective data pieces are the same as those in the following examples unless otherwise noted. Therefore, in the following description, repeated description will be omitted.

Example 2

Figure 2:
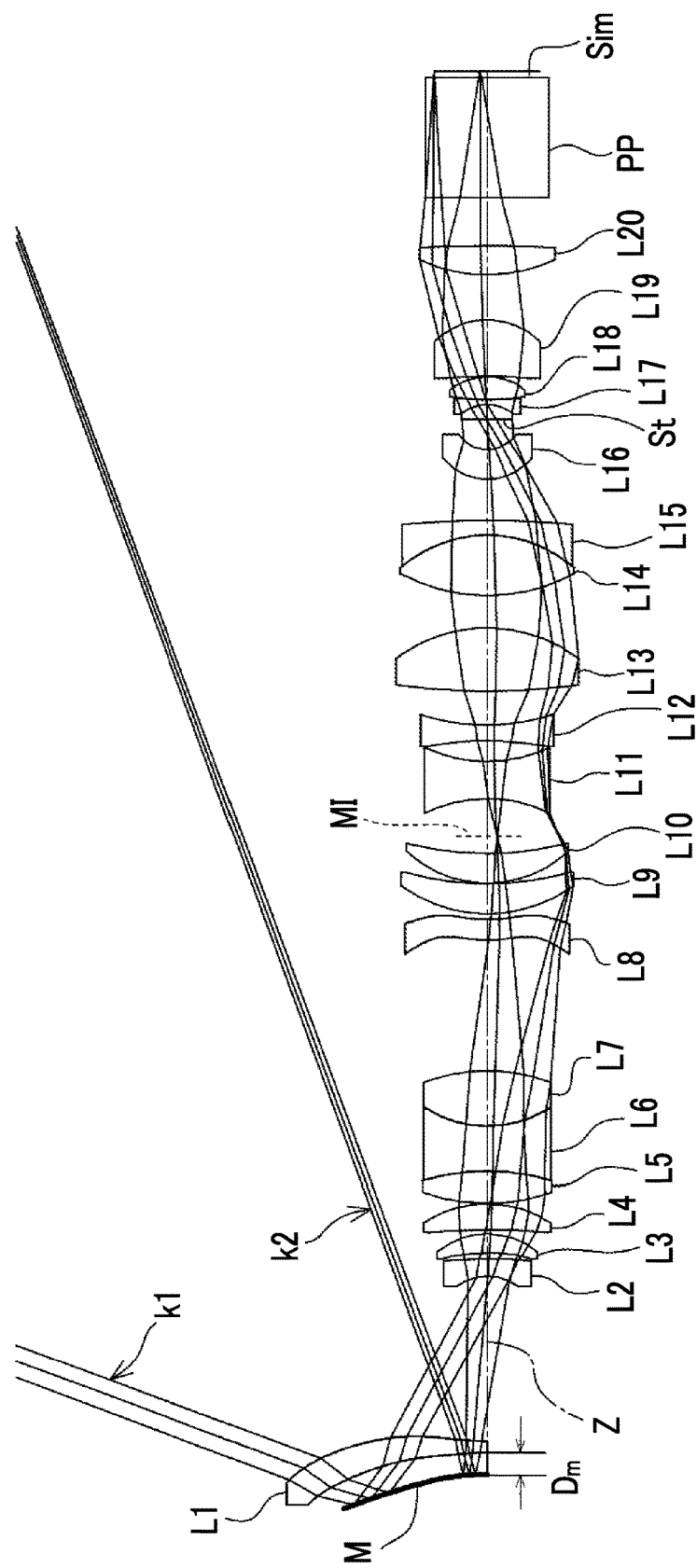
FIG. 2 is a cross-sectional view illustrating a configuration and an optical path of a projection optical system of Example 2 of the present invention.

FIG. 2 is a cross-sectional view of a lens configuration and an optical path of a projection optical system of Example 2. The projection optical system of Example 2 includes a convex mirror M, a first lens L1, and lenses L2 to L20. The first lens L1 is disposed across both the optical path closer to the reduction side than the convex mirror M and the optical path closer to the magnification side than the convex mirror M. An intermediate image MI is formed between the lens L10 and the lens L11. An aperture stop St is disposed between the lens L16 and the lens L17.

Figure 5:
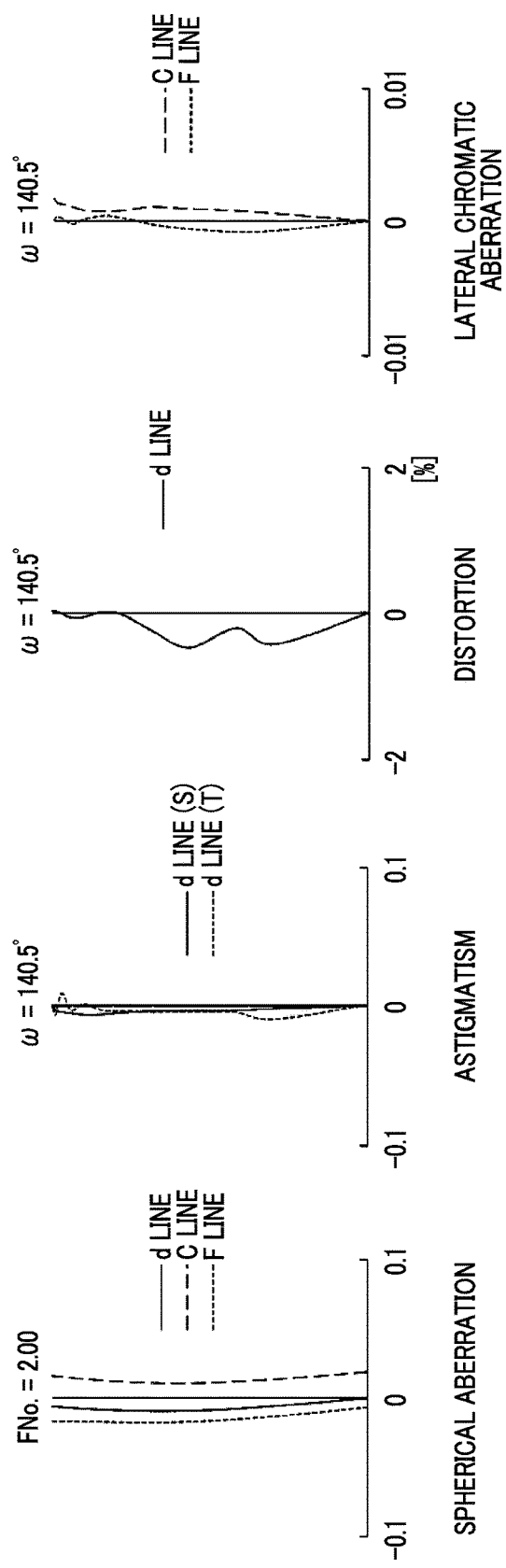
FIG. 5 is a diagram of aberrations of the projection optical system of Example 2 of the present invention.

Table 4 shows basic lens data of the projection optical system of Example 2, Table 5 shows specification, Table 6 shows aspheric surface coefficients, and FIG. 5 shows aberration diagrams. The aberration diagrams are aberration diagrams in a case where the distance from the magnification side imaging surface to the first lens L1 is a value shown in Table 4.

TABLE 4

Example 2

| Surface Number | R | D | Nd | νd |
|---|---|---|---|---|
| | | −131.2381 | | |
| *1 | 12.5973 | −0.5826 | 1.53158 | 55.08 |

TABLE 4-continued

Example 2

| Surface Number | R | D | Nd | vd |
|---|---|---|---|---|
| *2 | −10.3002 | −1.1227 | | |
| *3 | −20.6008 | 1.1227 | Reflective Surface | |
| *4 | −10.3002 | 0.5826 | 1.53158 | 55.08 |
| *5 | 12.5973 | 8.4820 | | |
| 6 | −2.8308 | 0.9028 | 1.76182 | 26.52 |
| 7 | −22.2309 | 0.3111 | | |
| 8 | −9.2345 | 0.9526 | 1.72916 | 54.68 |
| 9 | −4.2962 | 0.2220 | | |
| 10 | −38.2793 | 1.3114 | 1.89286 | 20.36 |
| 11 | −6.2614 | 0.0379 | | |
| 12 | 10.8846 | 1.6006 | 1.62041 | 60.29 |
| 13 | −12.1243 | 2.2860 | 1.84666 | 23.78 |
| 14 | 6.3316 | 2.8594 | 1.49700 | 81.61 |
| 15 | −9.6329 | 6.6699 | | |
| *16 | 8.8726 | 1.0477 | 1.51007 | 56.24 |
| *17 | 9.7232 | 0.2925 | | |
| 18 | 8.1366 | 1.5421 | 1.80000 | 29.84 |
| 19 | 17.0449 | 0.0379 | | |
| 20 | 6.5692 | 1.5062 | 1.80400 | 46.58 |
| 21 | 17.5597 | 2.8439 | | |
| 22 | −7.8801 | 1.8937 | 1.58913 | 61.13 |
| 23 | 7.9970 | 1.0761 | | |
| 24 | −17.1158 | 0.7928 | 1.62041 | 60.29 |
| 25 | 11.8282 | 1.7386 | | |
| 26 | 36.0389 | 3.2385 | 1.80100 | 34.97 |
| 27 | −8.3162 | 1.6403 | | |
| 28 | 10.0752 | 3.0966 | 1.80400 | 46.58 |

TABLE 4-continued

Example 2

| Surface Number | R | D | Nd | vd |
|---|---|---|---|---|
| 29 | −7.1957 | 0.7621 | 1.84666 | 23.78 |
| 30 | −50.5853 | 2.0884 | | |
| 31 | 3.1220 | 1.5241 | 1.80518 | 25.42 |
| 32 | 1.9104 | 1.5461 | | |
| 33 (St) | ∞ | 0.7621 | | |
| 34 | −2.3219 | 0.2408 | 1.74077 | 27.79 |
| 35 | 14.6951 | 1.1385 | 1.59282 | 68.62 |
| 36 | −3.3344 | 0.0380 | | |
| 37 | −21.1301 | 2.8572 | 1.49700 | 81.61 |
| 38 | −4.1107 | 2.3419 | | |
| 39 | 8.7335 | 1.4768 | 1.69680 | 55.53 |
| 40 | −77.6921 | 2.7914 | | |
| 41 | ∞ | 6.1528 | 1.51633 | 64.14 |
| 42 | ∞ | | | |

TABLE 5

Example 2

| | |
|---|---|
| \|f\| | 1.00 |
| Bf | 6.84 |
| FNo. | 2.00 |
| 2ω [°] | 140.5 |

TABLE 6

Example 2

| | Surface Number | | |
|---|---|---|---|
| | 1 | 2 | 3 |
| KA | 1.000000000000E+00 | 1.000000000000E+00 | 5.000008398714E+00 |
| A3 | 0.000000000000E+00 | 0.000000000000E+00 | −6.734077863344E−03 |
| A4 | −2.470796195637E−03 | 1.040440265138E−02 | 5.312218183157E−03 |
| A5 | 1.160610470039E−04 | −2.958327877667E−03 | −4.602465994071E−03 |
| A6 | 4.302472130236E−05 | −8.216354114796E−05 | 1.244133880485E−03 |
| A7 | −4.290596958741E−06 | 1.150896416975E−04 | 2.078267562720E−04 |
| A8 | −2.803532851263E−07 | −7.259015814563E−06 | −1.419705969474E−04 |
| A9 | 6.797586395032E−08 | −1.692957670677E−06 | 7.703687553027E−06 |
| A10 | −2.045209605685E−09 | 2.044060364115E−07 | 5.794026544752E−06 |
| A11 | −4.835868219217E−10 | 4.806089767723E−09 | −8.253255597991E−07 |
| A12 | 3.530809703310E−11 | −1.542906616578E−09 | −1.051554939559E−07 |
| A13 | 1.272047131334E−12 | 5.564917318979E−11 | 2.607322166487E−08 |
| A14 | −1.266138336183E−13 | 8.018500275624E−14 | 4.936565865291E−10 |
| A15 | | | −4.043286937666E−10 |
| A16 | | | 1.087130230772E−11 |
| A17 | | | 3.136671033830E−12 |
| A18 | | | −1.643196231021E−13 |
| A19 | | | −9.736667330174E−15 |
| A20 | | | 6.700724442546E−16 |

| | Surface Number | |
|---|---|---|
| | 4 | 5 |
| KA | 1.000000000000E+00 | 1.000000000000E+00 |
| A3 | 0.000000000000E+00 | 0.000000000000E+00 |
| A4 | 1.040440265138E−02 | −2.470796195637E−03 |
| A5 | −2.958327877667E−03 | 1.160610470039E−04 |
| A6 | −8.216354114796E−05 | 4.302472130236E−05 |
| A7 | 1.150896416975E−04 | −4.290596958741E−06 |
| A8 | −7.259015814563E−06 | −2.803532851263E−07 |
| A9 | −1.692957670677E−06 | 6.797586395032E−08 |
| A10 | 2.044060364115E−07 | −2.045209605685E−09 |
| A11 | 4.806089767723E−09 | −4.835868219217E−10 |
| A12 | −1.542906616578E−09 | 3.530809703310E−11 |
| A13 | 5.564917318979E−11 | 1.272047131334E−12 |
| A14 | 8.018500275624E−14 | −1.266138336183E−13 |

TABLE 6-continued

Example 2

| | Surface Number | |
|---|---|---|
| | 16 | 17 |
| KA | 1.000000000000E+00 | 1.000000000000E+00 |
| A3 | 2.027540813820E−02 | 2.545183647960E−02 |
| A4 | −1.776862793745E−02 | −1.646278136071E−02 |
| A5 | 4.192547675383E−03 | 4.138009000136E−03 |
| A6 | −9.831821895690E−04 | −2.088212107977E−03 |
| A7 | −5.412981944375E−04 | −2.050945364064E−04 |
| A8 | 2.670742573158E−04 | 4.411124506263E−04 |
| A9 | 1.080957557480E−05 | −5.174921340278E−05 |
| A10 | −2.100624774455E−05 | −2.855163507582E−05 |
| A11 | 2.309186867841E−06 | 5.864188797770E−06 |
| A12 | 8.092776742423E−07 | 8.370618313330E−07 |
| A13 | −1.944168712361E−07 | −2.482574355451E−07 |
| A14 | −1.356902444341E−08 | −1.066994543065E−08 |
| A15 | 6.649206764608E−09 | 4.999744402902E−09 |
| A16 | −4.895403768873E−11 | 3.842497336361E−11 |
| A17 | −1.087077428360E−10 | −4.546191218383E−11 |
| A18 | 4.822142817137E−12 | −2.225995639076E−13 |
| A19 | 6.996945420248E−13 | 1.288501287656E−13 |
| A20 | −4.680956203632E−14 | 6.826213003213E−15 |

Example 3

Figure 3:
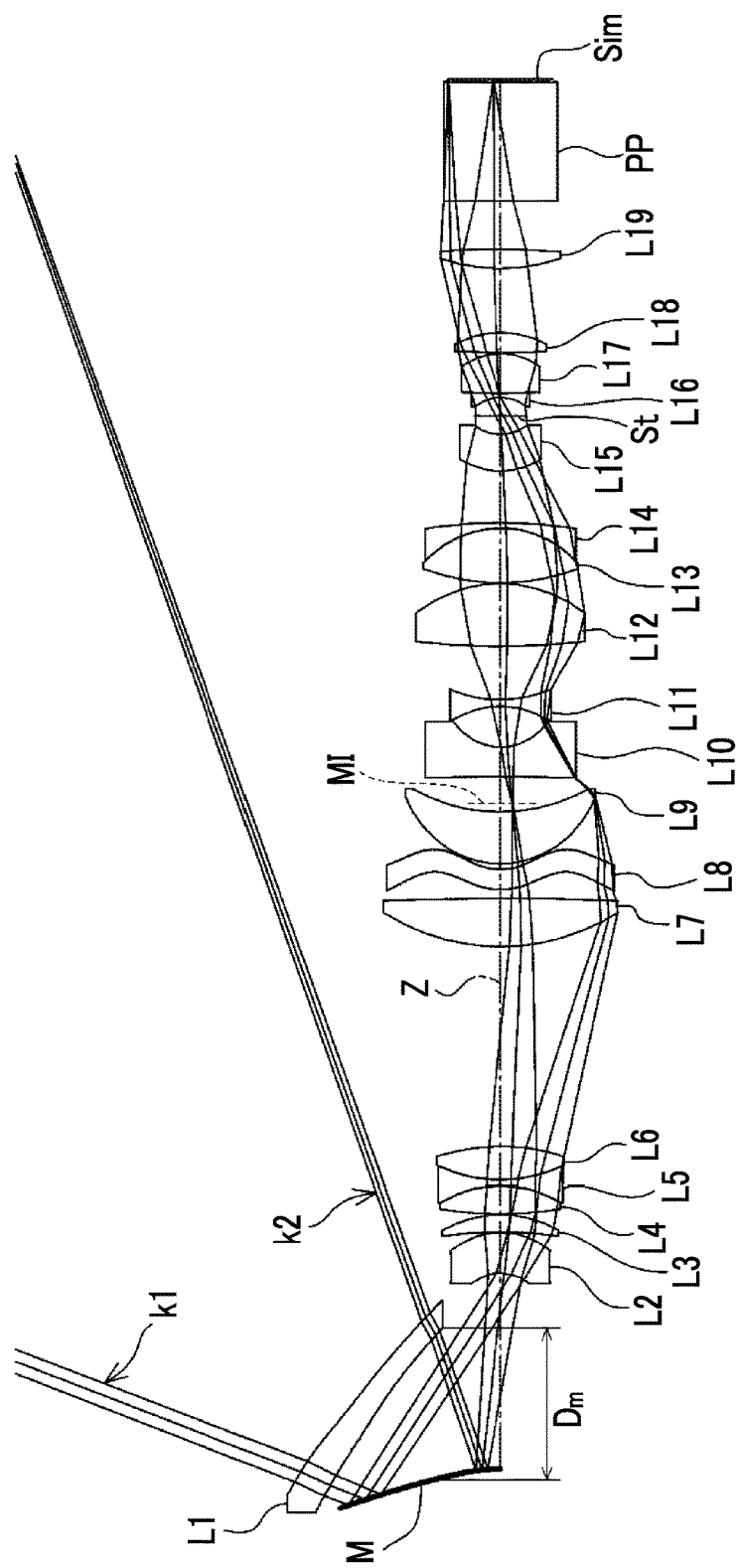
FIG. 3 is a cross-sectional view illustrating a configuration and an optical path of a projection optical system of Example 3 of the present invention.

FIG. 3 is a cross-sectional view of a lens configuration and an optical path of a projection optical system of Example 3. The projection optical system of Example 3 includes a convex mirror M, a first lens L1, and lenses L2 to L19. The first lens L1 is not present on the optical axis but is disposed only on the optical path closer to the magnification side than the convex mirror M. An intermediate image MI is formed between the lens L9 and the lens L10. An aperture stop St is disposed between the lens L15 and the lens L16.

Figure 6:
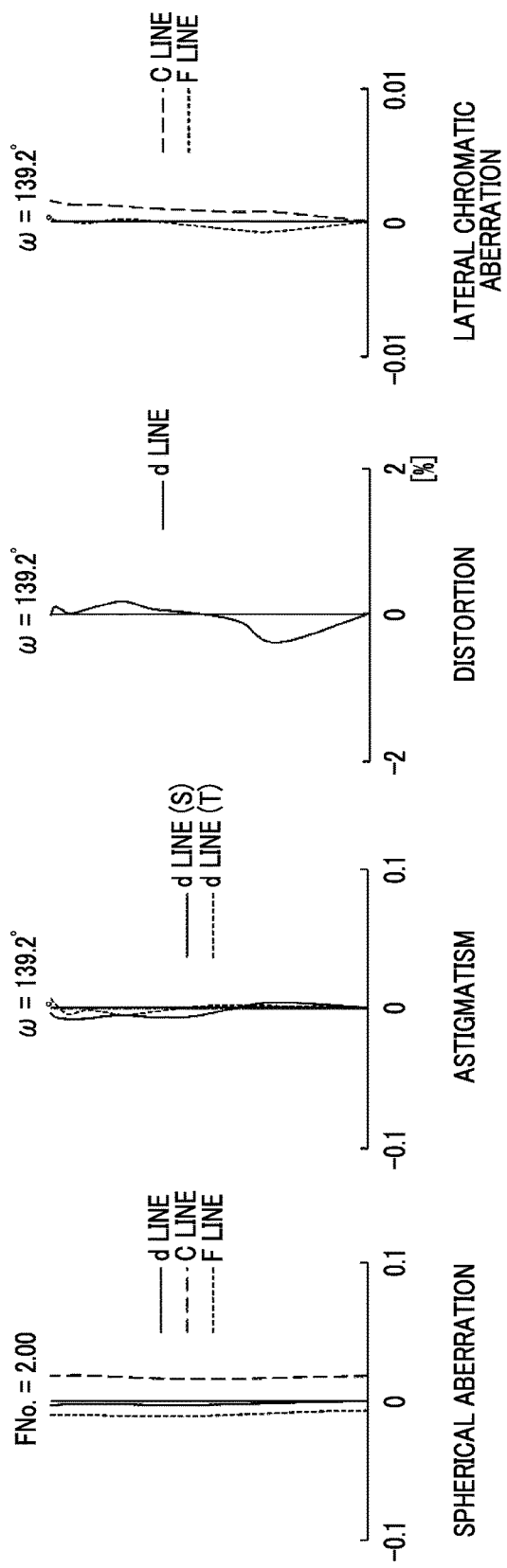
FIG. 6 is a diagram of aberrations of the projection optical system of Example 3 of the present invention.

Table 7 shows basic lens data of the projection optical system of Example 3, Table 8 shows specification, Table 9 shows aspheric surface coefficients, and FIG. 6 shows aberration diagrams. The aberration diagrams are aberration diagrams in a case where the distance from the magnification side imaging surface to the first lens L1 is a value shown in Table 7.

TABLE 7

Example 3

| Surface Number | R | D | Nd | νd |
|---|---|---|---|---|
| | | −137.9404 | | |
| *1 | −52.9046 | −0.7345 | 1.53158 | 55.08 |
| *2 | −58.4378 | −8.6312 | | |
| *3 | −8.3996 | 9.7309 | Reflective Surface | |
| 4 | −2.5172 | 2.0414 | 1.80518 | 25.42 |
| 5 | −3.9789 | 0.0366 | | |
| 6 | −22.3238 | 0.8397 | 1.89286 | 20.36 |
| 7 | −6.1776 | 0.0366 | | |
| 8 | 18.9700 | 1.4034 | 1.62041 | 60.29 |
| 9 | −6.1600 | 0.2478 | 1.84666 | 23.78 |
| 10 | 7.9056 | 1.6635 | 1.53775 | 74.70 |
| 11 | −11.3989 | 9.9597 | | |
| 12 | 11.7388 | 2.4062 | 1.80400 | 46.58 |
| 13 | −150.7573 | 0.4286 | | |
| *14 | 6.9219 | 1.0104 | 1.51007 | 56.24 |
| *15 | 8.9816 | 0.2755 | | |
| 16 | 5.2799 | 2.5641 | 1.80610 | 33.27 |
| 17 | 9.5818 | 1.7536 | | |
| 18 | −194.6118 | 1.4810 | 1.51680 | 64.20 |
| 19 | 3.0329 | 2.0162 | | |
| 20 | −4.7029 | 0.3305 | 1.63980 | 34.47 |

TABLE 7-continued

Example 3

| Surface Number | R | D | Nd | νd |
|---|---|---|---|---|
| 21 | 6.8850 | 2.6620 | | |
| 22 | 37.8974 | 3.1225 | 1.80000 | 29.84 |
| 23 | −7.2652 | 0.0366 | | |
| 24 | 11.8273 | 2.7422 | 1.75500 | 52.32 |
| 25 | −5.4796 | 0.2572 | 1.80518 | 25.42 |
| 26 | −26.1390 | 2.5470 | | |
| 27 | 3.9312 | 1.8366 | 1.80518 | 25.42 |
| 28 | 2.3649 | 0.9283 | | |
| 29 (St) | ∞ | 0.9182 | | |
| 30 | −2.2004 | 0.1838 | 1.80518 | 25.42 |
| 31 | 33.5527 | 1.9591 | 1.59282 | 68.62 |
| 32 | −3.5296 | 0.0367 | | |
| 33 | 30.8115 | 1.0097 | 1.49700 | 81.61 |
| 34 | −5.2033 | 3.1882 | | |
| 35 | 9.9948 | 0.9663 | 1.72916 | 54.68 |
| 36 | −45.9818 | 2.5495 | | |
| 37 | ∞ | 5.9328 | 1.51633 | 64.14 |
| 38 | ∞ | | | |

TABLE 8

Example 3

| |f| | 1.00 |
|---|---|
| Bf | 6.45 |
| FNo. | 2.00 |
| 2ω [°] | 139.2 |

TABLE 9

Example 3

| | Surface Number | | |
|---|---|---|---|
| | 1 | 2 | 3 |
| KA | 1.000000000000E+00 | 1.000000000000E+00 | 7.757089504301E−02 |
| A3 | −1.369856278576E−02 | −1.642664019065E−01 | −1.066757756046E−03 |
| A4 | −1.892970058353E−02 | 3.882307124025E−02 | 2.610971873815E−03 |
| A5 | 3.061914761252E−03 | 5.895992938764E−03 | −2.080860364351E−04 |
| A6 | 8.697524570096E−04 | −3.303111370316E−03 | −6.994764496907E−05 |
| A7 | −1.620331425820E−04 | 9.987011655234E−05 | 1.056186448718E−05 |
| A8 | −1.786575627385E−05 | 1.239543412410E−04 | 8.165112465005E−07 |
| A9 | 4.110790516429E−06 | −1.372646648945E−05 | −2.266421818595E−07 |
| A10 | 1.473527291231E−07 | −2.136097479564E−06 | 1.495767055442E−09 |
| A11 | −5.449264570597E−08 | 3.934839735236E−07 | 2.497447247531E−09 |
| A12 | 2.199044517814E−10 | 1.123919575411E−08 | −1.622674953013E−10 |
| A13 | 3.636214087184E−10 | −4.797089130134E−09 | −1.194095538507E−11 |
| A14 | −1.025506249095E−11 | 1.023836726060E−10 | 1.926409493320E−12 |
| A15 | −9.645890703649E−13 | 2.176076208716E−11 | −1.130225765186E−14 |
| A16 | 4.248048346102E−14 | −1.044520702721E−12 | −9.901031975832E−15 |
| A17 | | | 3.239530745303E−16 |
| A18 | | | 2.023059715859E−17 |
| A19 | | | −8.684570879090E−19 |
| A20 | | | −4.570723917466E−21 |

| | Surface Number | |
|---|---|---|
| | 14 | 15 |
| KA | 1.000000000000E+00 | 1.000000000000E+00 |
| A3 | 8.352655979054E−02 | 1.128349008621E−01 |
| A4 | −4.550302411117E−02 | −7.693647162399E−03 |
| A5 | 1.126945645324E−02 | −2.644499608579E−02 |
| A6 | 2.385737147772E−03 | 3.915600368834E−03 |
| A7 | −4.006699192148E−03 | 2.920179780272E−03 |
| A8 | 7.705879669671E−04 | −7.127597747036E−04 |
| A9 | 3.937293016582E−04 | −1.640645520410E−04 |
| A10 | −1.480559315143E−04 | 5.972962090658E−05 |
| A11 | −1.238334645912E−05 | 3.965548275413E−06 |
| A12 | 1.113622720935E−05 | −2.724295078371E−06 |
| A13 | −4.775998147381E−07 | 3.159028875410E−08 |
| A14 | −4.157413699868E−07 | 6.903621380142E−08 |
| A15 | 4.886798955612E−08 | −4.039567104460E−09 |
| A16 | 6.878462732767E−09 | −8.855032206056E−10 |
| A17 | −1.401610301185E−09 | 8.447537891490E−11 |
| A18 | −8.227735171742E−12 | 3.714015973500E−12 |
| A19 | 1.414116980698E−11 | −5.947205129268E−13 |
| A20 | −7.439602287928E−13 | 1.356238130318E−14 |

Table 10 shows values corresponding to Conditional Expressions (1) to (4) of the projection optical systems of Examples 1 to 3. In Examples 1 to 3, the d line is set as the reference wavelength, and the values shown in Table 10 are based on the d line.

TABLE 10

| Expression Number | | Example 1 | Example 2 | Example 3 |
|---|---|---|---|---|
| (1) | |f/fL1| | 0.05 | 0.09 | 0.00 |
| (2) | |f/Dm| | 1.08 | 0.89 | 0.15 |
| (3) | |f/Mr| | 0.08 | 0.05 | 0.12 |
| (4) | |f1/f| | 1.98 | 1.61 | 1.68 |

As can be seen from the above-mentioned data, each of the projection optical system of Examples 1 to 3 has a wide angle such that a total angle of view is equal to or greater than 139° and has a small F number such that the F number is 2, whereby aberrations are satisfactorily corrected, and high optical performance is achieved.

Figure 7:
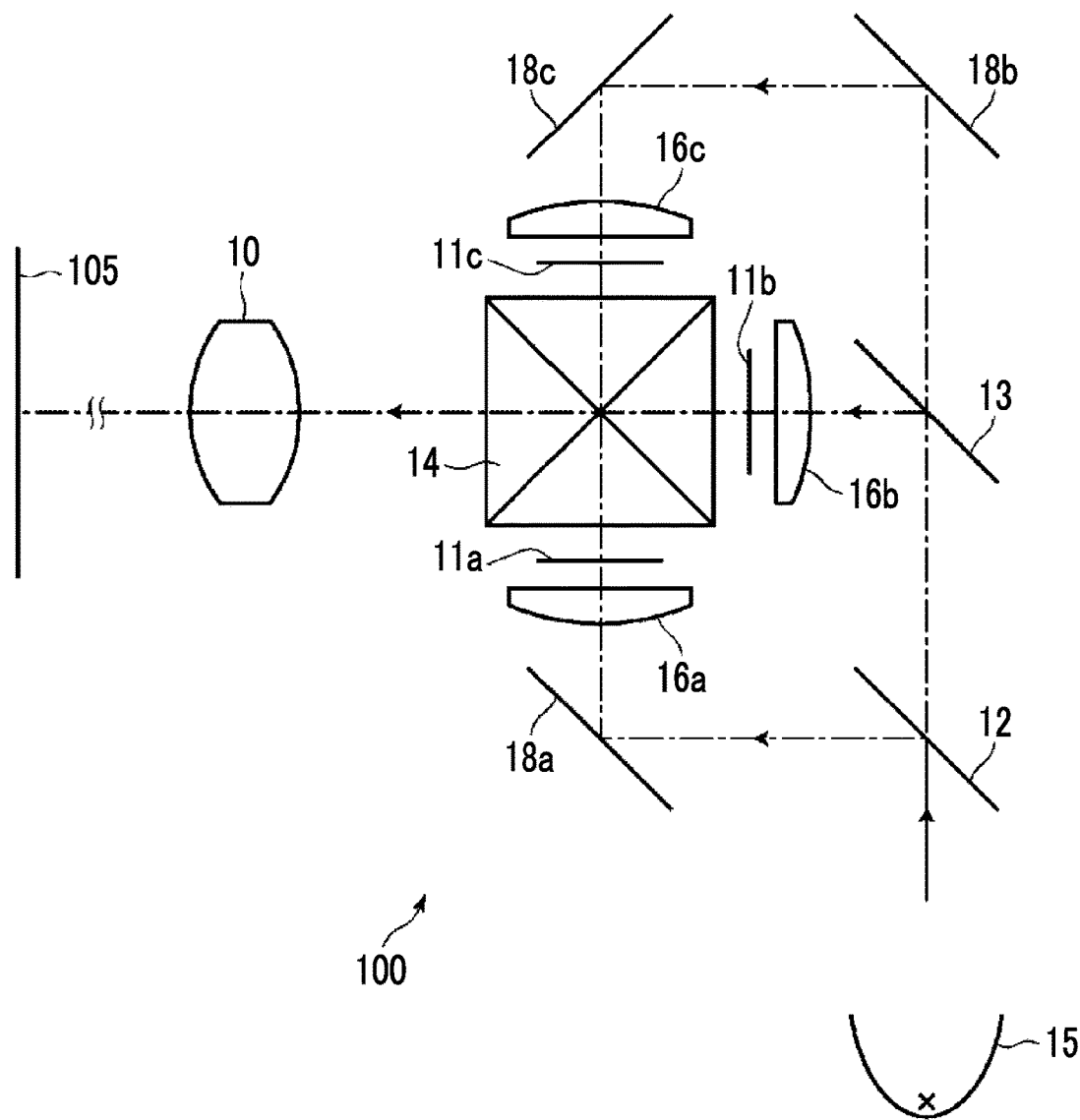
FIG. 7 is a schematic configuration diagram of a projection display device according to an embodiment of the present invention.

Next, a projection display device according to an embodiment of the present invention will be described. FIG. 7 is a schematic configuration diagram of the projection display device according to the above-mentioned embodiment of the present invention. The projection display device 100 shown in FIG. 7 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 7, the imaging optical system 10 is schematically illustrated. Further, an integrator is disposed between the light source 15 and the dichroic mirror 12, but illustration thereof is omitted in FIG. 7.

White light originated from the light source 15 is separated into rays with three colors (green light, blue light, red light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the modulated light modulated through the transmissive display elements 11a to 11c, onto a screen 105.

Figure 8:
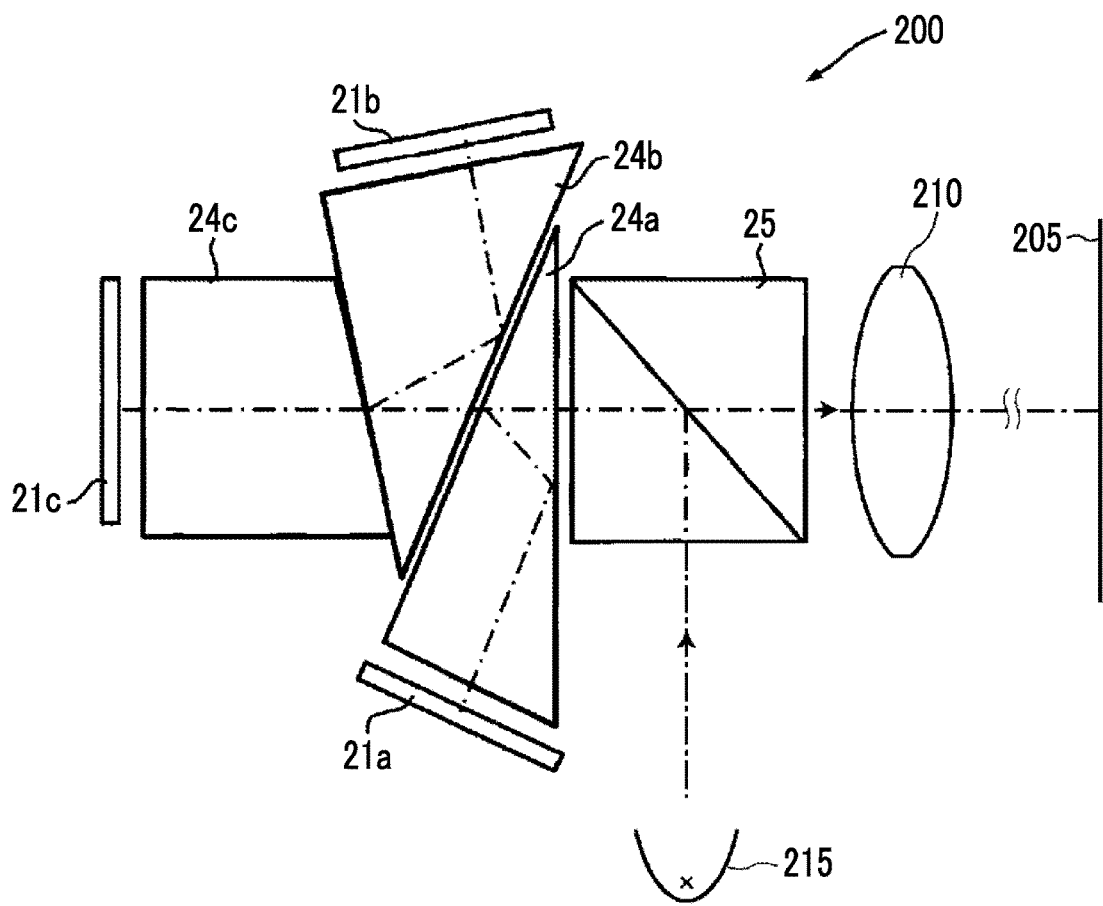
FIG. 8 is a schematic configuration diagram of a projection display device according to another embodiment of the present invention.

FIG. 8 is a schematic configuration diagram of a projection display device according to another embodiment of the present invention. The projection display device 200 shown in FIG. 8 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 8, the imaging optical system 210 is schematically illustrated. Further, an integrator is disposed between the light source 215 and the polarization separating prism 25, but illustration thereof is omitted in FIG. 8.

White light originated from the light source 215 is reflected on a reflective surface inside the polarization separating prism 25, and is separated into rays with three colors (green light, blue light, red light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the modulated light modulated through the DMD elements 21a to 21c, onto a screen 205.

Figure 9:
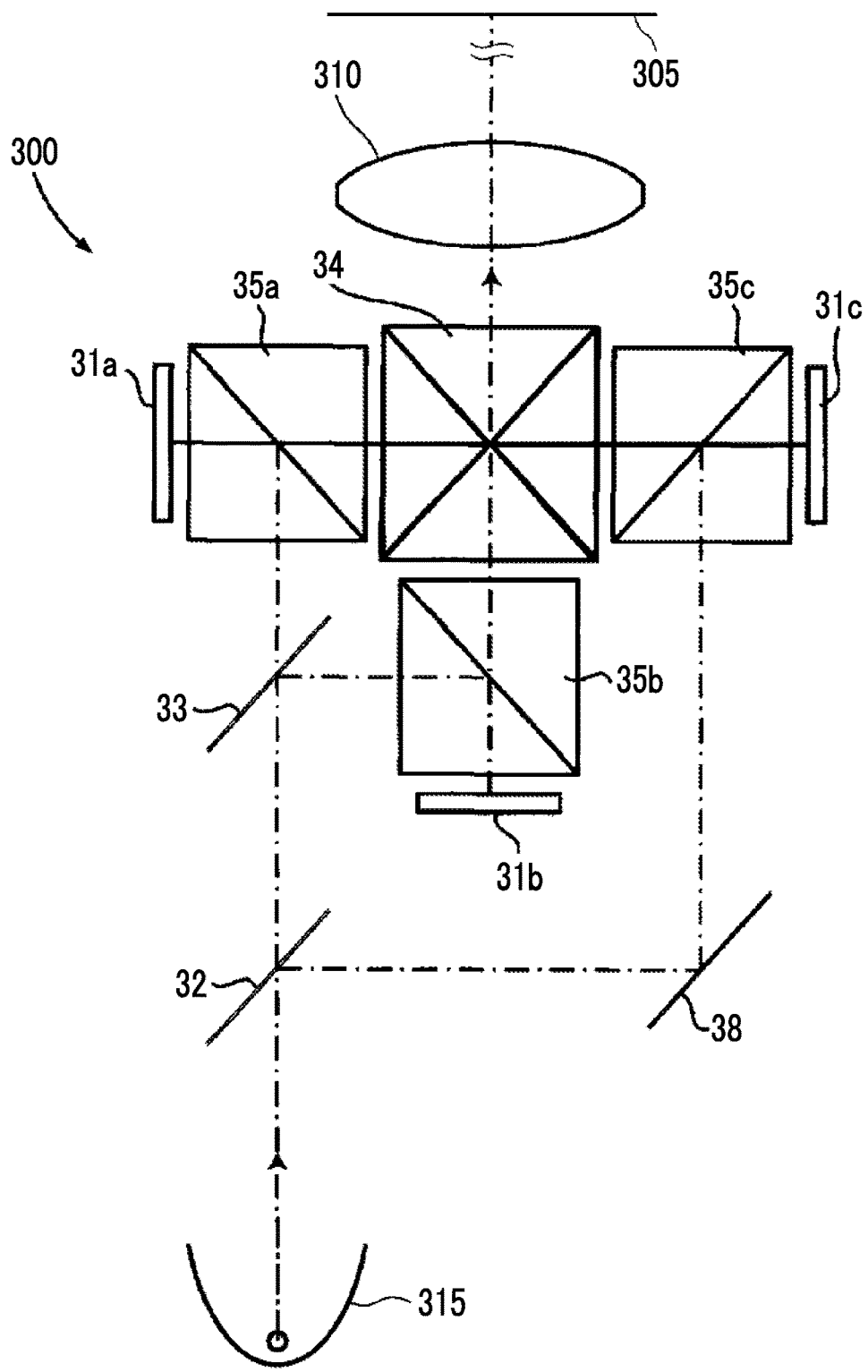
FIG. 9 is a schematic configuration diagram of a projection display device according to still another embodiment of the present invention.

FIG. 9 is a schematic configuration diagram of a projection display device according to still another embodiment of the present invention. The projection display device 300 shown in FIG. 9 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 9, the imaging optical system 310 is schematically illustrated. Further, an integrator is disposed between the light source 315 and the dichroic mirror 32, but illustration thereof is omitted in FIG. 9.

White light originated from the light source 315 is separated into rays with three colors (green light, blue light, red light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the modulated light modulated through the reflective display elements 31a to 31c, onto a screen 305.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

The projection display device of the present invention is also not limited to the above-mentioned configuration, and various modifications of the optical member and the light valve used for the ray separation or the ray synthesis, for example, can be made.

What is claimed is:

1. A projection optical system that forms an intermediate image at a position conjugate to a reduction side imaging surface and forms a final image conjugate to the intermediate image on a magnification side imaging surface, the projection optical system comprising:
   a convex mirror that is disposed to be closer to a magnification side than the intermediate image; and
   at least one lens that has a positive or negative refractive power and is disposed in an optical path so as to be closer to the magnification side than the convex mirror.

2. The projection optical system according to claim 1, wherein a lens, which is disposed in the optical path so as to be closer to the magnification side than the convex mirror, is only one first lens.

3. The projection optical system according to claim 2, wherein assuming that a focal length of the projection optical system is f and a focal length of the first lens is fL1, Conditional Expression (1) is satisfied, $$|f/fL1|<0.2 \quad (1).$$

4. The projection optical system according to claim 2,
   wherein the first lens and the convex mirror have a common optical axis, and
   wherein the first lens is an aspheric lens having a rotationally symmetrical shape.

5. The projection optical system according to claim 2,
   wherein the first lens and the convex mirror have a common optical axis, and
   wherein assuming that a distance between the first lens and the convex mirror in a direction of an optical axis at a lowest position on a lens surface of the first lens close to the convex mirror from the optical axis is Dm and a focal length of the projection optical system is f, Conditional Expression (2) is satisfied, $$0.05<|f/Dm|<2 \quad (2).$$

6. The projection optical system according to claim 2, wherein the first lens is disposed across the optical path closer to the magnification side than the convex mirror and the optical path closer to the reduction side than the convex mirror.

7. The projection optical system according to claim 1, wherein assuming that a focal length of the projection optical system is f and a paraxial radius of curvature of the convex mirror is Mr, Conditional Expression (3) is satisfied, $$0.01<|f/Mr|<0.2 \quad (3).$$

8. The projection optical system according to claim 1, wherein all optical elements composing the projection optical system have a common optical axis.

9. The projection optical system according to claim 3, wherein Conditional Expression (1-1) is satisfied, $$|f/fL1|<0.15 \quad (1\text{-}1).$$

10. The projection optical system according to claim 5, wherein Conditional Expression (2-1) is satisfied, $$0.07<|f/Dm|<1.5 \quad (2\text{-}1).$$

11. The projection optical system according to claim 7, wherein Conditional Expression (3-1) is satisfied, $$0.03<|f/Mr|<0.15 \quad (3\text{-}1).$$

12. A projection display device comprising:
a light source;
a light valve into which light emitted from the light source is incident; and
the projection optical system according to claim 1,
wherein the projection optical system projects an optical image using modulated light, which is modulated through the light valve, onto a screen.

* * * * *